United States Patent
Ebner et al.

(10) Patent No.: US 10,336,289 B2
(45) Date of Patent: Jul. 2, 2019

(54) HYBRID INFLATOR, METHOD OF OPERATING A HYBRID INFLATOR, AIRBAG MODULE AND VEHICLE SAFETY SYSTEM

(71) Applicant: TRW Airbag Systems GmbH, Aschau am Inn (DE)

(72) Inventors: Johannes Ebner, Mühldorf (DE); Sebastian Bierwirth, Rechtmehring (DE); Martin Oberstarr, Polling (DE); Detlef Last, Mühldorf (DE)

(73) Assignee: TRW AIRBAG SYSTEMS GMBH, Aschau am Inn (DE)

( * ) Notice: Subject to any disclaimer, the term of this patent is extended or adjusted under 35 U.S.C. 154(b) by 0 days.

(21) Appl. No.: 15/423,674

(22) Filed: Feb. 3, 2017

(65) Prior Publication Data
US 2017/0232923 A1     Aug. 17, 2017

(30) Foreign Application Priority Data

Feb. 12, 2016 (DE) .................. 10 2016 001 611

(51) Int. Cl.
*B60R 21/272* (2006.01)
*B60R 21/274* (2011.01)
*B60R 21/268* (2011.01)

(52) U.S. Cl.
CPC .......... *B60R 21/272* (2013.01); *B60R 21/274* (2013.01); *B60R 2021/2685* (2013.01)

(58) Field of Classification Search
CPC .................................................. B60R 21/264
See application file for complete search history.

(56) References Cited

U.S. PATENT DOCUMENTS 5,803,493 A * 9/1998 Paxton .................. B60R 21/272
                                                                 280/737
5,882,036 A * 3/1999 Moore .................. B01D 39/12
                                                                 149/36
(Continued)

FOREIGN PATENT DOCUMENTS

DE         19545077            6/1997
DE    102006006036 A1 *  8/2006  .......... B60R 21/264
(Continued)

*Primary Examiner* — Nicole T Verley
(74) *Attorney, Agent, or Firm* — Tarolli, Sundheim, Covell & Tummino LLP (57) ABSTRACT

The invention relates to a hybrid inflator (10) comprising a combustion chamber (20) and a pressure gas tank (30), wherein in the idle state of the hybrid inflator (10) an outlet opening (31) of the pressure gas tank (30) is closed by a bursting element (32) which in the case of function of the hybrid inflator (10) can be destroyed by means of a penetration element (40), wherein a mixing chamber (70) is formed between the pressure gas tank (30) and the combustion chamber (20). In accordance with the invention, between the combustion chamber (20) and the mixing chamber (70) at least in portions a partition wall (80) having a combustion chamber side (81) and a mixing chamber side (82) is formed, wherein the partition wall (80) includes at least one combustion chamber opening (85) which in the idle state of the hybrid inflator (10) is closed by a cover (88) formed on the mixing chamber side (82) of the partition wall (80).

15 Claims, 4 Drawing Sheets

(56) References Cited

U.S. PATENT DOCUMENTS

| | | | | |
|---|---|---|---|---|
| 6,068,291 | A * | 5/2000 | Lebaudy | B60R 21/2644 102/217 |
| 6,231,079 | B1 | 5/2001 | Perotto et al. | |
| 6,244,623 | B1 * | 6/2001 | Moore | B60R 21/2644 280/737 |
| 6,447,008 | B1 * | 9/2002 | Karlin | B60R 21/272 280/736 |
| 6,601,872 | B2 | 8/2003 | Zimbrich | B60R 21/272 280/737 |
| 6,626,461 | B2 * | 9/2003 | Koga | B60R 21/2644 102/531 |
| 6,793,244 | B1 | 9/2004 | Katsuda et al. | |
| 7,059,633 | B2 * | 6/2006 | Wang | B60R 21/272 222/5 |
| 7,192,052 | B2 * | 3/2007 | Smith | B60R 21/26 280/737 |
| 7,226,078 | B2 * | 6/2007 | Green | B60R 21/268 102/531 |
| 7,325,829 | B2 * | 2/2008 | Kelley | B60R 21/272 280/736 |
| 7,341,276 | B2 * | 3/2008 | Kelley | B60R 21/272 280/736 |
| 7,401,808 | B2 * | 7/2008 | Rossbach | B60R 21/268 137/68.27 |
| 7,469,926 | B2 * | 12/2008 | Lewis | B60R 21/2338 280/736 |
| 7,527,291 | B2 * | 5/2009 | Young | B60R 21/268 280/737 |
| 7,735,861 | B2 * | 6/2010 | Poindron | B60R 21/272 102/531 |
| 8,191,927 | B2 * | 6/2012 | Jordan | B60R 21/2644 280/736 |
| 9,295,935 | B1 * | 3/2016 | Adamczyk | B01D 46/0097 |
| 9,751,492 | B2 * | 9/2017 | Kobayashi | B60R 21/272 |
| 9,789,845 | B2 * | 10/2017 | Ebner | B60R 21/261 |
| 9,827,943 | B2 * | 11/2017 | Kobayashi | B60R 21/272 |
| 2007/0029762 | A1 * | 2/2007 | Katsuda | B60R 21/2338 280/728.2 |
| 2007/0085309 | A1 * | 4/2007 | Kelley | B60R 21/272 280/736 |
| 2010/0127486 | A1 * | 5/2010 | Asanuma | B60R 21/261 280/737 |
| 2014/0305330 | A1 * | 10/2014 | Stevens | B60R 21/272 102/530 |
| 2017/0015273 | A1 * | 1/2017 | Kobayashi | B60R 21/268 |
| 2017/0036901 | A1 * | 2/2017 | Kuroda | B60R 21/274 |
| 2017/0043743 | A1 * | 2/2017 | Kobayashi | B60R 21/274 |
| 2017/0080894 | A1 * | 3/2017 | Kobayashi | B60R 21/272 |
| 2017/0282844 | A1 * | 10/2017 | Kobayashi | B60R 21/274 |

FOREIGN PATENT DOCUMENTS

| | | |
|---|---|---|
| EP | 2952394 B1 * | 8/2017 |
| JP | 0958394 | 3/1997 |

* cited by examiner

HYBRID INFLATOR, METHOD OF OPERATING A HYBRID INFLATOR, AIRBAG MODULE AND VEHICLE SAFETY SYSTEM

RELATED APPLICATION

This application claims priority from German Application No. 10 2016 001 611.6, filed Feb. 12, 2016, the subject matter of which is incorporated herein by reference in its entirety.

BACKGROUND OF THE INVENTION

The invention relates to a hybrid inflator comprising a combustion chamber and a pressure gas tank, wherein in the idle state of the hybrid inflator a discharge opening of the pressure gas tank is closed by a bursting element which can be destroyed by means of a penetration element in the case of function of the hybrid inflator. In addition, the invention relates to a method of operating a hybrid inflator, to an airbag module and to a vehicle safety system.

Occupant restraint systems for automotive vehicles usually include airbag modules comprising an airbag which in the case of crash is inflated so as to reduce the probability of collision of body parts of a vehicle occupant with a vehicle component. For inflating the airbag in the case of crash, for example hybrid inflators are provided which consist of a pressure gas tank comprising compressed gas or cold gas in the idle state of the hybrid inflator and a pyrotechnical subassembly, wherein the pyrotechnical subassembly serves for triggering and/or heating the gas that is originally compressed and is discharged in the case of function of the hybrid inflator. The pressure gas of such hybrid inflator may be closed toward the pyrotechnical subassembly in a pressure-tight manner.

This is enabled, for example, by a bursting membrane and, resp., by a bursting cap to which in the idle state of the hybrid inflator pressure gas stored in the pressure gas tank can be or is applied on its outer peripheral side. By the term "in the idle state" and, resp., "in the idle state of the hybrid inflator" it is to be understood that the hybrid inflator has not yet been activated or, in other words, relating to the bursting membrane, that the bursting membrane is closed and no activating signal is yet provided in response to which the bursting membrane is to be opened or burst.

Document EP 1 053 915 B1, especially FIGS. 1 to 4 there, illustrate the structure of a hybrid inflator comprising a storage chamber as well as a pyrotechnical ignition device. The storage chamber is separated from a combustion chamber with the aid of an inner cap or an inner membrane. In the case of activation or function of the hybrid inflator, the inner cap or the inner membrane is ripped and, resp., opened by a piston-like device. For this, a movably supported piston and a guiding device are provided, wherein the piston is pressurized in the case of activation so that the piston pierces the inner cap or the inner membrane. For guiding the piston part carriers as well as guide means are required. This is a relatively complex design consisting of plural components and seals which have to be provided, inter alia, with expensive component tolerances.

Moreover, it has turned out that a piston as shown in EP 1 053 915 B1 can temporarily close the discharge opening of a pressure gas tank again after activation of the hybrid inflator so that no continuous discharge of the gas present in the pressure gas tank can be guaranteed.

Further, it is known that for igniting a pyrotechnical propellant in airbag inflators openings of a combustion chamber in which such propellant is received are closed by tamping on the inside of the combustion chamber so as to obtain uniform ignition of the entire propellant and/or particular pressure build-up inside the combustion chamber before the openings of the combustion chamber are released by bursting of the tamping. Said tamping then ruptures at a predetermined increased pressure in the combustion chamber. Said pressure is dependent on the strength and the thickness of the tamping as well as on the diameter of the openings. Frequently the opening pressure of the tamping is similar to the maximum combustion chamber pressure. The relatively high opening pressure results in a sudden discharge of gases. This is also known by the term "high onset" requiring extremely high strengths of the module casing and of the airbag.

For the mechanical opening of the pressure gas tank the bursting element thereof is destroyed according to EP 1 053 915 B1 by a piston. Previous hybrid inflators exploit the pressure inside the combustion chamber generated by the pyrotechnical combustion for moving the mechanism. Said pressure prevailing in the combustion chamber is higher than the internal pressure of the pressure tank for sufficiently safe opening of the pressure tank. Such required high pressure inside the pyrotechnical combustion chamber requires sufficiently high strength in the combustion chamber design. As soon as the functional pressure of the combustion chamber is designed to be higher than the filling pressure of the pressure gas tank, the combustion chamber has to be designed to exhibit an appropriately high strength.

SUMMARY OF THE INVENTION

It is the object of the present invention to state a further developed hybrid inflator so as to overcome the aforementioned drawbacks. It is a further object to state a further developed method of operating a hybrid inflator. Moreover, it is the object of the invention to state an airbag module comprising a further developed hybrid inflator. It is a further object of the invention to state a vehicle safety system comprising a further developed hybrid inflator or comprising a further developed airbag module.

In accordance with the invention, this object is achieved with respect to the hybrid inflator by the subject matter of claim 1 or 3, with respect to the method of operating a hybrid inflator by the subject matter of claim 7, with respect to the airbag module by the subject matter of claim 12 and with respect to the vehicle safety system by the subject matter of claim 13.

Advantageous and useful configurations of the hybrid inflator according to the invention and, resp., of the method of operating a hybrid inflator according to the invention are stated in the subclaims.

The hybrid inflator according to claim 1 primarily serves for overcoming the drawback mentioned second according to which high opening pressure inside the combustion chamber has to be prevented.

The hybrid inflator according to claim 3 primarily serves for overcoming the drawback mentioned third according to which the detrimental high functional pressure of the combustion chamber and a required high strength of the individual elements and/or components of the hybrid inflator resulting therefrom is to be avoided.

According to a first aspect, a hybrid inflator comprising a combustion chamber and a pressure gas tank is stated, wherein in the idle state of the hybrid inflator a discharge opening of the pressure gas tank is closed by a bursting element which in the case of function of the hybrid inflator can be destroyed by means of a penetration element.

The penetration element may have a portion through which gas flows and at least one penetration edge facing the bursting element in the idle state.

Preferably the penetration element has at least one recess extending in the longitudinal extension of the penetration element starting from the penetration edge.

Accordingly, the pressure gas tank is closed by a bursting element in the idle state of the hybrid inflator. The bursting element preferably may be a bursting disk or a bursting membrane. Said bursting element is made from such material that it can be destroyed by means of a penetration element upon activation of the hybrid inflator. The penetration element is movable in the case of function of the hybrid inflator, i.e. upon activation of the hybrid inflator, so that the penetration element can be moved in the direction of the bursting element.

In the idle state of the hybrid inflator a penetration edge of the penetration element faces toward the bursting element. In other words, the bursting element is aligned with the penetration element and with the penetration edge of the penetration element, respectively. The penetration element includes a portion through which gas may flow. In other words, the penetration element is an elongate member formed at least in portions so that gas may flow therethrough. The portion through which gas may flow and, resp., the penetration element itself can have a largely cylindrical design, for example.

The portion through which gas may flow is configured so that a penetration edge is formed on the penetration element. Starting from the penetration edge, the penetration element may include a recess extending in the longitudinal extension of the penetration element. The recess thus projects up to the penetration edge and forms a recess or breakthrough even in the penetration edge. The longitudinal extension of the penetration element is understood to be the extension of the element in which the penetration element has the maximum extension and, resp., length. Preferably the longitudinal extension of the penetration edge is in conformity with the longitudinal extension of the hybrid inflator.

Preferably the penetration element is designed and arranged to be aligned with the longitudinal extension of the pressure gas tank. The recess prevents the penetration element from punching a full-surface element out of the bursting element in the case of function of the hybrid inflator. Rather, the penetration element may destroy the bursting element without parts of the bursting element or portions of the bursting element being punched out or torn off.

Since the penetration element includes a portion through which gas may flow, in the case of function the gas provided in the pressure gas tank may flow out of the discharge opening of the pressure gas tank through the portion of the penetration element through which gas can flow. The gas can laterally flow out of the at least one recess extending in the longitudinal extension of the penetration element, especially when the recess is designed to have an appropriate length. The at least one recess of the penetration element may also be referred to as slit.

Accordingly, the penetration element is prevented from covering the discharge opening of the gas pressure tank in the case of function and from having a blocking effect in terms of flow for desired gas discharge from the pressure gas tank.

The at least one recess of the penetration element preferably forms an interruption in the at least one penetration edge.

In a preferred embodiment, the penetration element may include, starting from the penetration edge, at least two recesses extending in the longitudinal extension of the penetration element so that at least two penetration legs are formed. According to this embodiment, too, the recesses form several interruptions in the at least one penetration edge.

If the penetration edge substantially takes a circular shape, the at least one recess forms an interruption of the circular shape.

If plural recesses are formed in the longitudinal extension of the penetration element, the penetration edge has plural interruptions. It is imaginable that at least three, especially at least four, especially at least five, recesses extending in the longitudinal extension of the penetration element are formed in the penetration element. Thus it is possible that at least three, especially at least four, especially at least five, penetration legs are formed.

A penetration leg may also be referred to as pin or tine of the penetration element. The formation of plural penetration legs prevents any larger bursting element portions from being punched out of the bursting element.

In another embodiment, the penetration element may have at least one, preferably fully circumferential, stop face which is formed by a shoulder portion being spaced apart from the penetration edge. A shoulder portion of the penetration element is such portion which has a larger cross-section as compared to the portion of the penetration element including the at least one penetration edge. The shoulder portion, in other words, forms a broadening of the penetration element. The shoulder portion may also be referred to as thickening of the penetration element. The stop face is formed at the shoulder portion. Preferably the stop face is formed fully circumferentially in relation to the penetration element.

In the radially peripheral wall of the shoulder portion at least one gas outlet opening may be formed. The latter causes the gas originally provided in the pressure gas tank to flow out of said gas outlet opening, primarily in the case of function of the hybrid inflator. Even when the penetration element contacts the pressure gas tank, the gas provided in the pressure gas tank may flow out of the penetration element and, resp., of the portion through which gas may flow, viz. through the at least one gas outlet opening.

In another embodiment, the at least one gas outlet opening is a partial portion, especially an end portion, of the at least one recess. In such case the at least one recess is formed to be so long that it protrudes into the shoulder portion and forms a gas outlet opening in the shoulder portion. This offers the advantage that, when manufacturing the penetration element, the at least one gas outlet opening and the at least one recess need not be introduced into the penetration element in separate manufacturing steps, but merely one recess of appropriate length has to be introduced into the penetration element.

In the case of function, the stop face preferably contacts a tank wall delimiting the discharge opening of the pressure gas tank or a holder of the bursting element. Thus the stop face prevents the penetration element from completely penetrating the pressure gas tank in the case of function.

The penetration element may also be referred to as projectile. When looking at the penetration edge it is evident that in the penetration edge at least one, preferably plural interruptions or notches is/are introduced so that the bursting element is not evenly damaged and rupturing of an area, especially a circular area, is inhibited. If nevertheless a portion of the bursting element is torn out or punched out, the recesses ensure that sufficiently large discharge surfaces are available for the gas or pressure gas provided in the pressure gas tank.

The penetration element may have a clearance, especially for receiving a sealing element, at an end facing away from the penetration edge. Accordingly, the clearance may also be referred to as groove. Due to the sealing element no pressure loss may occur laterally from the penetration element with respect to the pressure formed which drives the penetration element in the case of function and, resp., no undesired gas flows may flow laterally past the penetration element.

Preferably the hybrid inflator is configured so that the at least one recess and/or the at least one gas discharge opening fluid-communicates the pressure gas tank, in the case of function of the hybrid inflator, with a mixing chamber formed between the pressure gas tank and the combustion chamber. In other words, the gas provided in the pressure gas tank may flow out of the pressure gas tank and flow into the mixing chamber. Accordingly, gas may flow out of the pressure gas tank after destruction of the bursting element closing the pressure gas tank starting from the pressure gas tank into a mixing chamber.

In a further embodiment, an ignition tube preferably ending in a/the mixing chamber or delimiting also a/the mixing chamber is formed inside the combustion chamber of the hybrid inflator, wherein the penetration element is longitudinally movable at least in portions inside the ignition tube.

The ignition tube is an elongate hollow body having a circular cross-section, for example. Preferably, in one end of the ignition tube an igniter, especially an igniter cap, is inserted. At the other end opposed to the first end preferably the penetration element is introduced. The penetration element preferably has a further or second stop face. Preferably also said further or second stop face is formed by a/the shoulder portion spaced apart from the penetration edge. In the idle state of the hybrid inflator the penetration element preferably contacts a notch or, resp., a shoulder of the ignition tube with the notch or the shoulder being preferably located at the second end of the ignition tube.

The ignition tube is preferably filled with a pyrotechnical igniting mixture and/or a pyrotechnical booster charge. Upon activation of the hybrid inflator the igniter first ignites the igniting mixture provided in the ignition tube and/or the booster charge.

The ignition tube has at least one opening which fluid-communicates an inner area of the ignition tube with the combustion chamber. The at least one opening may be closed in the idle state of the hybrid inflator by a closure element or a tamping element, preferably a film made from metal, especially from aluminum, copper or steel, wherein the tamping element can be opened in the case of function so as to establish a fluid communication of the inner area of the ignition tube with the combustion chamber. Preferably the ignition tube is formed in the longitudinal direction of the combustion chamber coaxially to said longitudinal axis. The ignition tube is preferably completely surrounded by the combustion chamber. The combustion chamber preferably has an annular shape in cross-section. Inside said annular shape the ignition tube is located.

In the case of function of the hybrid inflator the bursting element of the pressure gas tank can be destroyed like a projectile by the penetration element.

An independent second aspect of the invention relates to a hybrid inflator comprising a combustion chamber and a pressure gas tank, wherein an outlet opening of the pressure gas tank in the idle state of the hybrid inflator is closed by a bursting element which, in the case of function of the hybrid inflator, can be destroyed by means of a penetration element, with a mixing chamber being formed between the pressure gas tank and the combustion chamber.

In accordance with the invention, between the combustion chamber and the mixing chamber at least in portions a partition wall having a combustion chamber side and a mixing chamber side is formed, wherein the partition wall includes at least one combustion chamber opening which in the idle state of the hybrid inflator is closed by a cover formed on the mixing chamber side of the partition wall. The cover in this case is understood to be a different component part which is separate from the penetration element.

In other words, the partition wall includes a combustion chamber side and a mixing chamber side. The combustion chamber side is the side of the partition wall facing the combustion chamber. The mixing chamber side is the side of the partition wall facing the mixing chamber.

The cover preferably is a membrane and/or a film, especially a tamping.

The cover may be made from metal, especially from steel and/or copper and/or aluminum.

As compared to previously known combustion chamber covers, the cover is comparatively thin. In other words, the tamping is relatively weak and can be opened by means of very low opening pressures, the opening pressures forming inside the combustion chamber by burn-off of a pyrotechnical propellant stored inside the combustion chamber.

The mixing chamber may serve for mixing hot gas flowing out of the combustion chamber with cold gas flowing out of the pressure gas tank. For this purpose, the mixing chamber is formed between the pressure gas tank and the combustion chamber.

The mixing chamber includes at least one generator opening which fluid-communicates the hybrid inflator with an element to be inflated, in particular an airbag. Preferably in the partition wall plural combustion chamber openings are formed. The combustion chamber openings may be round holes, for example. Moreover, it is imaginable that the combustion chamber opening takes the shape of a peripheral ring. The cover is dimensioned to be larger than the cross-section of the at least one combustion chamber opening. The at least one cover is preferably welded or glued onto the mixing chamber side of the partition wall.

Preferably the pressure gas tank is closed by a bursting element in the idle state of the hybrid inflator. The bursting element preferably may be a bursting disk or a bursting membrane. Said bursting element is made from such material that it can be destroyed by means of a penetration element upon activation of the hybrid inflator. In the case of function of the hybrid inflator, i.e. upon activation of the hybrid inflator, the penetration element can be made to move so that the penetration element can be moved in the direction of the bursting element.

Upon activation of the hybrid inflator according to the invention, in a first step a/the bursting membrane of the pressure gas tank is destroyed so that at first the gas, especially cold gas, of the pressure gas tank flows into the mixing chamber. In the mixing chamber back pressure is formed so that the cover is bent and, resp., forced in the direction of the combustion chamber. In other words, the cover is stabilized and, resp., pressed to the mixing chamber side of the partition wall by the pressure of the outflowing cold gas. In this way, the cover may be designed to be very weak so that in the combustion chamber merely low opening pressures have to be achieved in order to destroy the cover of the combustion chamber.

At first merely a gas portion, especially cold gas portion, of the pressure gas tank flows out of the mixing chamber through the at least one generator opening into the environment of the hybrid inflator, preferably into an airbag. Then, after opening the combustion chamber, hot gas may flow into the mixing chamber and from there further on through the at least one generator opening into the environment of the hybrid inflator, wherein advantageously moderate outflow of the hot gas occurs due to the arrangement of the cover according to the invention on the mixing chamber side of the partition wall, causing reduced combustion chamber pressures and opening pressures, resp., to be produced which are required for opening the cover. In this way, a definitely lower onset is reached which is less wearing to the hybrid inflator and the airbag. In other words, an altogether moderate outflow of filling gas from the hybrid inflator into an airbag is reached in this way.

The hybrid inflator according to the second independent aspect may include features and/or embodiments of the hybrid inflator in accordance with the first aspect. It is especially possible that the hybrid inflator according to the second independent aspect of the invention includes a penetration element as described in connection with the first aspect.

Another, i.e. third, independent aspect of the invention relates to a hybrid inflator comprising a combustion chamber and a pressure gas tank, wherein an outflow opening of the pressure gas tank in the idle state of the hybrid inflator is closed by a bursting element which can be destroyed by means of a penetration element in the case of function of the hybrid inflator.

In accordance with the invention, the gas pressure generated or adapted to be generated in the combustion chamber in the case of function of the hybrid inflator is lower than the pressure in the pressure gas tank in the idle state of the hybrid inflator.

This configuration of the hybrid inflator allows the hybrid inflator, especially the combustion chamber and the components provided therein, to be given a smaller or weaker design as regards their strength. The gas pressure generated or adapted to be generated in the combustion chamber is by far lower than this is the case in accordance with known hybrid inflators.

In the combustion chamber preferably an ignition tube is formed, with the penetration element being longitudinally displaceable at least in portions inside the ignition tube.

Of preference, the ignition tube is filled with a pyrotechnical igniting mixture and/or a pyrotechnical booster charge.

The ignition tube has at least one opening which fluid-communicates an inner area of the ignition tube with the combustion chamber.

Preferably at least one mixing chamber is formed between the combustion chamber and the pressure gas tank.

Between the combustion chamber and the mixing chamber at least one partition wall having a combustion chamber side and a mixing chamber side is formed, with the partition wall including at least one combustion chamber opening which in the idle state of the hybrid inflator is closed by a cover preferably configured on the mixing chamber side of the partition wall.

Preferably the ignition tube has at its end facing the pressure gas tank, especially at the second end, a collar portion forming a/the partition wall between the combustion chamber and a/the mixing chamber.

In the longitudinal extension of the hybrid inflator the ignition tube may be completely surrounded by a combustion chamber of circular ring shape in cross-section.

Preferably, in the case of function of the hybrid inflator the bursting element of the pressure gas tank can be destroyed by the penetration element in a projectile-type manner.

The hybrid inflator according to the invention in accordance with the third independent aspect offers the advantage that the pressure gas tank can be opened independently of the pressure prevailing within the combustion chamber. For moving the penetration element, the energy of the igniter as well as of the ignited igniting mixture and, resp., the ignited booster charge is used. By said generated energy the penetration element destroys the bursting element of the pressure tank and triggers the outflow of the gas, especially of the cold gas, from the pressure gas tank. This takes place before pyrotechnical combustion gases exit the combustion chamber.

Therefore, the pressure generated in the combustion chamber merely has to be higher than the pressure prevailing in the mixing chamber. The gas pressure generated or adapted to be generated in the combustion chamber is thus lower than the pressure in the pressure gas tank in the idle state of the hybrid inflator. The combustion chamber as well as the elements or components provided in the same thus may be designed to be weaker or lower in terms of their strength.

The hybrid inflator according to the third independent aspect of the invention may include features and/or embodiments of the hybrid inflator according to the first aspect and/or the second independent aspect of the invention. It is especially possible that the hybrid inflator according to the third independent aspect of the invention includes a penetration element as described in connection with the first independent aspect. Moreover, it is possible that the hybrid inflator according to the third independent aspect of the invention includes a partition wall between the combustion chamber and the mixing chamber having an appropriate cover as described in connection with the second independent aspect of the invention.

Another independent aspect of the invention relates to a method of operating a hybrid inflator. Preferably a hybrid inflator according to the invention is operated in accordance with the first aspect and/or the second independent aspect of the invention and/or the third independent aspect of the invention.

The method according to the invention is characterized by the following method steps:
a) activating an igniter of the hybrid inflator;
b) activating a penetration element and moving the penetration element in the direction of a bursting element closing an outlet opening of a pressure gas tank;
c) opening the bursting element by means of the penetration element;
d) discharge of a first gas, especially cold gas, provided in the pressure gas tank through the outlet opening of the pressure gas tank into a mixing chamber;
e) building up back pressure in the mixing chamber and discharge of the first gas, especially cold gas, from the mixing chamber through at least one generator opening of the mixing chamber into an element to be inflated,
f) opening at least one cover closing a combustion chamber opening;
g) discharge of a second gas, especially hot gas, generated in the combustion chamber through the combustion chamber opening into the mixing chamber.

Preferably the method steps a) to g) are carried out successively in the given order.

The method according to the invention offers the advantage that after opening the bursting element at first only gas of the pressure gas tank, especially cold gas, flows into the mixing chamber and at the beginning of the method merely gas of the pressure gas tank, especially cold gas, flows from the hybrid inflator into an element to be inflated, preferably into an airbag. In the initial phase of the filling of the element to be inflated thus the element to be inflated and/or the entire airbag module is/are loaded less strongly.

The method according to the invention preferably comprises the further method steps of:
h) mixing the second gas, especially hot gas, with the first gas, especially cold gas, in the mixing chamber and forming a filling gas;
i) discharge of the filling gas from the mixing chamber through the at least one generator opening into the element to be inflated.

The element to be inflated preferably may be an airbag.

The inflow of the second gas, especially hot gas from the combustion chamber, may bring about the main filling of the element to be inflated, especially of the airbag. Due to the stepwise filling of the element to be inflated a desired low onset, also referred to as S-slope, may be achieved.

The material and/or the thickness of the at least one cover of the at least one combustion chamber opening preferably is designed so that in step e) the cover is pressed onto the at least one combustion chamber opening such that the pressure in the combustion chamber for opening the cover increases or may increase.

The back pressure forming in the mixing chamber acts on the cover which is preferably applied from outside to the combustion chamber so that the cover is pressed onto the combustion chamber opening. The cover is pressed onto the combustion chamber opening quasi like a lid. Only after certain part of the first gas, especially cold gas, already has flown into the element to be inflated, is the back pressure reduced.

At the same time, the pressure has continued to increase in the combustion chamber so that after a predetermined period of time, i.e. a set period of time, the at least one cover of the at least one combustion chamber opening is opened and/or destroyed. In an advantageous manner, an optimized discharge characteristic is set.

In the idle state of the hybrid inflator, the cover is connected to the mixing chamber side of a partition wall formed between the combustion chamber and the mixing chamber.

In step b) a pyrotechnical igniting mixture and/or a pyrotechnical booster charge is/are preferably ignited in an ignition tube formed inside the combustion chamber. Due to the configuration of an ignition tube, the energy of the igniter as well as of the ignited igniting mixture and/or the ignited booster charge may be used to accelerate or move the penetration element. The penetration element thus destroys the bursting element and then triggers outflow of the first gas, especially cold gas, from the pressure gas tank before pyrotechnical combustion gases exit the combustion chamber.

Another independent aspect of the invention relates to an airbag module comprising a hybrid inflator according to the invention in accordance with the first aspect and/or the second independent aspect of the invention and/or the third independent aspect of the invention. The airbag module further comprises an inflatable airbag. There are resulting advantages similar to those stated already in connection with the hybrid inflators according to the invention and/or the method of operating a hybrid inflator according to the invention.

Another independent aspect of the invention relates to a vehicle safety system comprising a hybrid inflator according to the invention in accordance with the first aspect and/or the second independent aspect of the invention and/or the third independent aspect of the invention or comprising an airbag module according to the invention. There are resulting advantages similar to those stated already in connection with the hybrid inflators according to the invention and/or the method of operating a hybrid inflator according to the invention and/or the airbag module according to the invention.

BRIEF DESCRIPTION OF THE DRAWINGS

Hereinafter the invention shall be illustrated in detail by way of embodiments with reference to the enclosed schematic figures, wherein.

DESCRIPTION

Hereinafter like reference numerals will be used for equal and equally acting parts.

Figure 1:
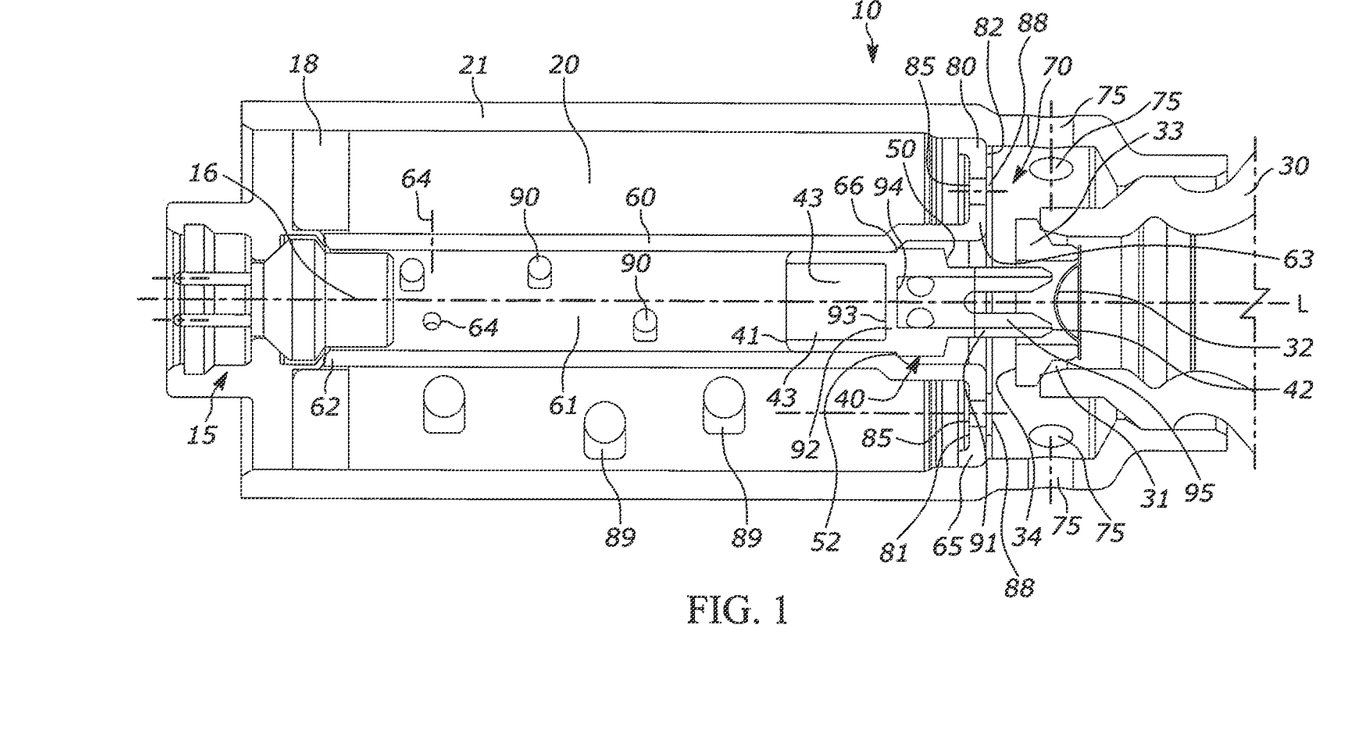
FIG. 1 shows a hybrid inflator according to the invention in the idle state.

In FIG. 1 a hybrid inflator 10 according to the invention is shown. It comprises a combustion chamber 20 and a pressure gas tank 30. FIG. 1 shows the hybrid inflator 10 according to the invention in an idle state. In the idle state an outlet opening 31 of the pressure gas tank 30 is closed by a bursting element 32. The bursting element 32 is arranged and, resp., fastened inside the pressure gas tank 30 by means of a bursting element holder 33.

The hybrid inflator 10 further comprises an igniter 15 comprising an igniter cap 16 and an ignition tube 60. In the ignition tube 60 an ignition channel 61 is formed. Especially the igniter cap 16 protrudes into the ignition tube 60, especially into the first end 62 of the ignition tube 60 and, resp., of the ignition channel 61. In the ignition tube 60 a pyrotechnical igniting mixture and/or a pyrotechnical booster charge comprising a plurality of booster elements (90) is/are provided.

The ignition tube 60 is formed inside the combustion chamber 20. The ignition tube 60 in the present case includes a circular cross-section. The combustion chamber 20, too, has a housing portion 21 which forms a combustion chamber 20 being ring-shaped in cross-section. The combustion chamber 20 thus surrounds the ignition tube 60 and the ignition channel 61, respectively. In the area of the igniter 15 a solid ring 18, for example made from compressible foam or silicone material, is formed. Said solid ring on the one hand serves for fixing and fastening the ignition tube 60, especially the first end 62 of the ignition tube 60. Moreover, by the solid ring 18 also the propellant bed located in the combustion chamber 20 and comprising a plurality of propellant compacts 89 may be fixed in position. In the ignition tube 60 openings 64 are formed. The openings 64 serve for establishing fluid communication between an inner area of the ignition tube 60 and, resp., the ignition channel 61 and the combustion chamber 20. The booster elements 90 and the propellant compacts 89 may comprise different known pyrotechnical compacts or molded compacts known to those skilled in the art from the field of gas generators and inflators, especially for vehicle safety systems. These may be compressed pellets, extrudates, granules or else a respective monolith of different geometry, wherein passages may also penetrate said bodies, i.e. the latter may take a hollow-cylindrical shape, for example. Accordingly, also different common dimensions and sizes are imaginable, wherein preferably the booster elements 90 have a smaller dimension than the propellant compacts 89 so as to cause a more rapid gas production upon activation and burn-off of the same. Of preference, the booster elements 90 are dimensioned so that they cannot pass through the openings 64 from the ignition channel 61 into the combustion chamber 20.

Between the combustion chamber 20 and a mixing chamber 70 a partition wall 80 comprising a combustion chamber side 81 and a mixing chamber side 82 is formed. The combustion chamber side 81 thus faces the combustion chamber 20. The mixing chamber side 82 faces the mixing chamber 70. The partition wall 80 includes combustion chamber openings 85 which in the shown idle state of the hybrid inflator 10 are closed by covers 88 formed on the mixing chamber side 82 of the partition wall 80. The covers 88 may also be referred to as tamping. Preferably the covers 88 are made from metal, especially from steel or copper or aluminum. The covers 88 may be glued or welded to the partition wall 80.

The mixing chamber 70 includes generator openings 75 for fluid-communicating the hybrid inflator 10 and, resp., the interior of the hybrid inflator 10 with an element to be inflated, preferably an airbag (not shown).

The ignition tube 60 includes, at its second end 63, viz. at its end 63 facing the pressure gas tank 30, a collar portion 65 which at least in portions forms the partition wall 80 between the combustion chamber 20 and the mixing chamber 70.

Inside the ignition tube 60 the penetration element 40 (exemplified in detail in FIGS. 3a-4) is arranged and, resp., supported to be longitudinally movable at least in portions. A notch 66 in the form of a shoulder prevents the penetration element 40 from being displaced completely in the direction of the first end 62 of the ignition tube 60.

Figure 2:
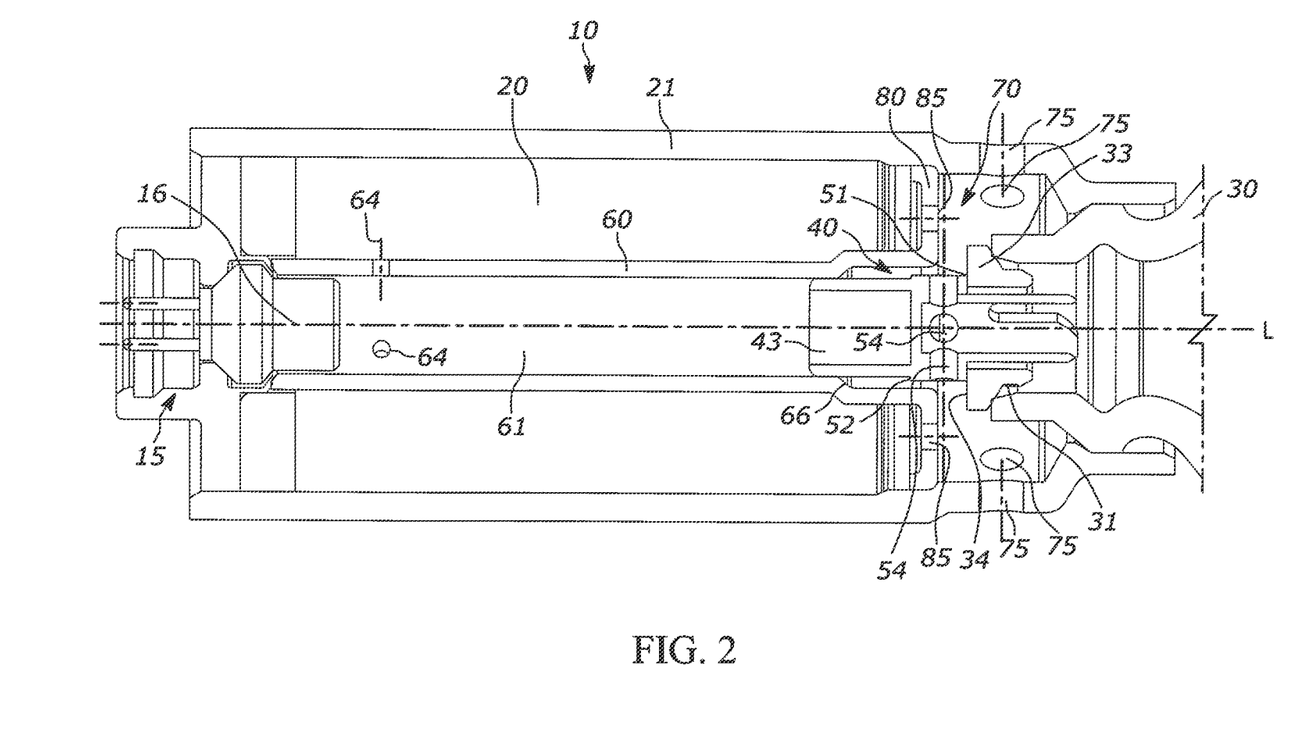
FIG. 2 shows a hybrid inflator according to the invention in the functioning state and, resp., in the case of function.

FIG. 2 shows the hybrid inflator 10 in a functioning state. For reaching the functioning state and for inflating the element to be inflated such as the airbag, according to the invention the following method steps which can be reproduced by way of FIG. 2 are successively carried out.

First of all, the igniter 15 of the hybrid inflator 10 is activated. In this way, the booster elements (90) located inside the ignition tube 60, i.e. the so called igniting mixture or booster charge, are ignited. The energy thus generated inside the ignition tube 60 and, resp., the pressure produced inside the ignition tube 60 and, resp., ignition gas acts on the penetration element 40 which is moved in the direction of the pressure gas tank 30.

Hence the penetration element 40 is moved in the direction of the outlet opening 31 and in the direction of the bursting element 32 closing the outlet opening 31. The penetration element 40 thus destroys and, resp., opens the bursting element 32 so that the pressure gas tank 30 is opened.

After that, a first gas provided in the pressure gas tank 30, especially cold gas, may flow out through the outlet opening 31 of the pressure tank 30 and flow into the mixing chamber 70. Inside the mixing chamber 70 thus back pressure is built up, wherein simultaneously the first gas, especially cold gas, flows from the mixing chamber 70 through the generator openings 75 into the element to be inflated (not shown). Due to the back pressure built up in the mixing chamber 70, the covers 88 are pressed into and, resp., onto the combustion chamber openings 85.

Only after a certain portion of the first gas, viz. cold gas, has flown into the element to be inflated, does the back pressure in the mixing chamber 70 decrease. Meanwhile the igniting gas may flow from the ignition tube 60 through the openings 64 into the combustion chamber 20. There the propellant bed and, resp., the individual propellant compacts 89 are ignited so that an opening pressure is built up in the combustion chamber 20. After a certain period of time, the pressure in the combustion chamber 20 is so high that the covers 88 can be opened. Subsequently the second gas, viz. hot gas, generated by the burn-off of the propellant compacts 89 in the combustion chamber 20 flows through the combustion chamber openings 85 into the mixing chamber 70.

In the mixing chamber 70 the hot gas is mixed with the cold gas and a filling gas is formed. Said filling gas may flow out of the mixing chamber 70 through the generator openings 75 into the element to be inflated.

The material and/or the thickness of the covers 88 of the combustion chamber openings 85 is/are designed so that the back pressure formed because of the cold gas is pressed onto the combustion chamber opening 85 so that the pressure in the combustion chamber 20 may increase for opening the covers 88, preferably to a particular predefined value.

After opening the pressure gas tank 30, at first only cold gas flows into the mixing chamber 70 and initially merely the cold gas flows through the generator openings 75 to the outside. In this initial phase of activating the hybrid inflator 10, less load is imparted to the airbag and thus the entire airbag module, wherein subsequently the principal filling of the airbag by means of the filling gas may take place by the hot gas inflow from the combustion chamber 20. A desired low onset, also referred to as S-slope, is achieved.

Figure 3A:
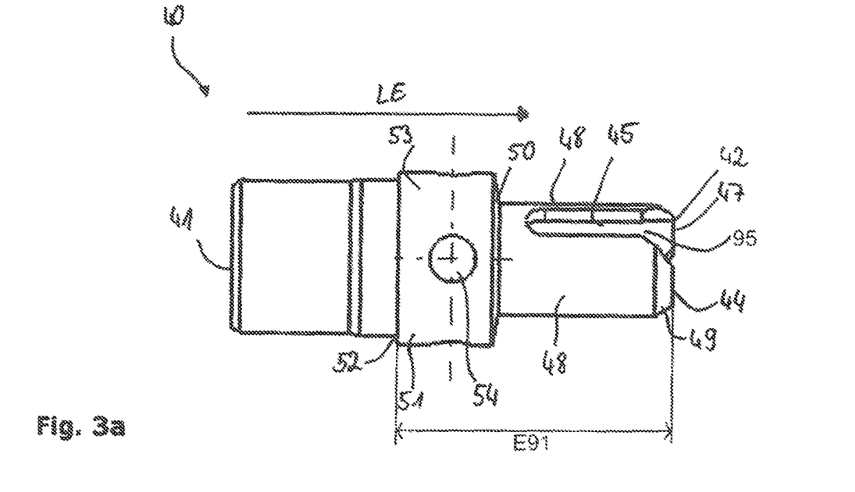
FIGS. 3a, 3b and 3c show different views regarding a first embodiment of a penetration element.
Figure 3B:
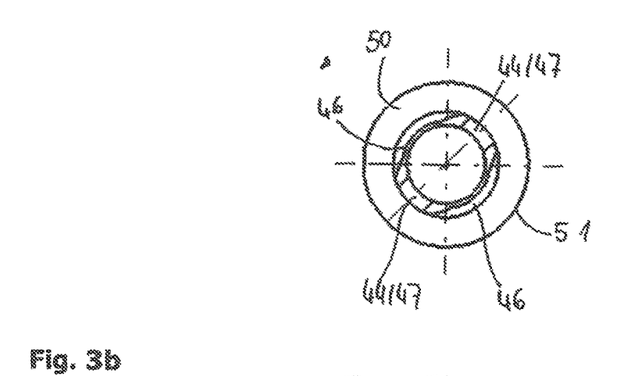
Figure 3C:
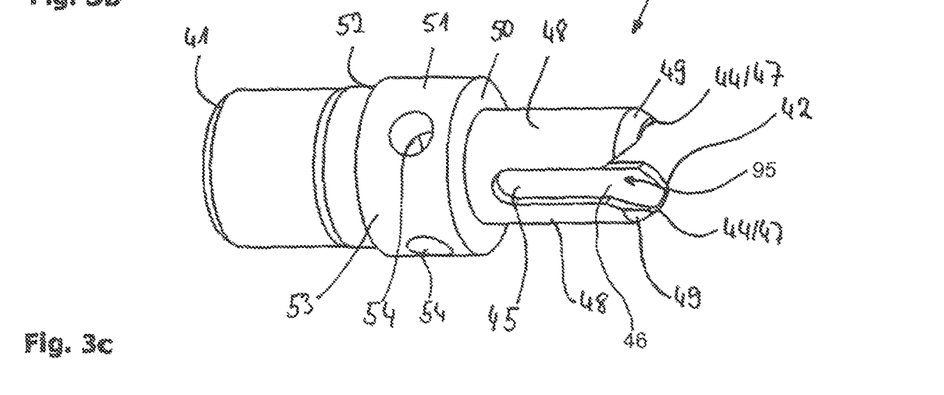
Figure 4:
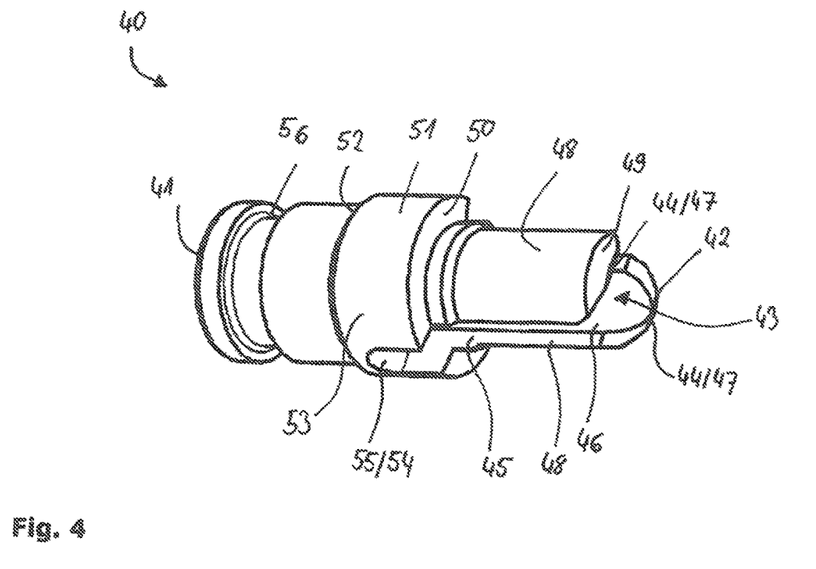
FIG. 4 shows a second embodiment of a penetration element.

The penetration element 40 is exemplified in detail in FIGS. 3a-4. The penetration element 40 does not have a complete gas-permeable passage in its axial direction between its two axial ends. Concretely speaking, from a first end 41 of the penetration element 40 a first hollow 43 is formed in the direction of a second end 42 of the penetration element 40, with the first hollow 43 being delimited by a first approach surface 93 of a radially extending approach element 92. The approach element 92 is an integrative component of the penetration element 40 and is a flat element having a particular thickness.

The approach element 92 substantially has the task to enable movement or displacement of the penetration element 40 in the case of function of the hybrid inflator 10 in that gas produced by the igniter 15, especially combustion gas by burn-off of the booster elements 90, is enabled to act with thrust on the first approach surface 93 of the approach element 92.

As is clearly visible from FIG. 1, the first approach surface 93 faces the igniter 15 and, resp., the igniter cap 16. The approach element 92 includes on its side opposed to the first approach surface 93, facing away from the igniter 15, a second approach surface 94 which faces toward the bursting element 32. Starting from the second approach surface 94 toward the second end 42 of the penetration element 40 a second hollow 95 is formed.

The area of the penetration element 40 extending from the second approach surface 94 to the second end 42 of the penetration element 40 is configured as a portion 91 of the penetration element 40 through which gas may flow or can be understood to be such portion, respectively. The portion 91 through which gas may flow extends from a stop face 52 of the penetration element 40 to the second end 42 of the penetration element 40 via an extension area E91, as shown in FIG. 3a. The stop face 52 will be described in more detail further below.

At the second end 42 of the penetration element 40 a penetration edge 44 is formed. Since the penetration element 40 includes a circular cross-section, also the penetration edge 44 is arranged substantially in circular shape.

In the mounting situation shown in FIGS. 1 and 2 the longitudinal extension LE of the penetration element 40 corresponds to the longitudinal axis L of the hybrid inflator 10. Starting from the penetration edge 44, the penetration element 40 includes two recesses 45 extending in the longitudinal extension LE of the penetration element 40. The recesses 45 thus constitute interruptions 46 in the penetration edge 44.

The penetration edge 44 is formed of two penetration edge portions 47.

The recesses 45 take a slot shape and at the same time form the interruptions 46 in the penetration edge 44. Due to the design of recesses 45 two penetration legs 48 are formed. The penetration legs 48 act as blades or tines. In the area of the penetration edge 44 and, resp., in the area of the penetration edge portions 47 tapers 49 are formed. This allows for easier destruction of a bursting element 32.

The penetration element 40 moreover includes a stop face 50 formed over the complete periphery. The stop face 50 is constituted by a shoulder portion 51 spaced apart from the penetration edge 44. The shoulder portion 51 causes an extension of the cross-section of the outer wall of the penetration element 40. In the functioning state of the hybrid inflator 10 the stop face 50 causes the penetration element 40 to contact the bursting element holder 33, especially the end face 34 thereof. The penetration element 40 thus cannot be moved further into the pressure gas tank 30. The cross-section of the shoulder portion 51 is larger than the inner cross-section of the outlet opening 31 of the pressure gas tank 30.

Due to the shoulder portion 51 a further, viz. second, stop face 52 is formed. The second stop face 52 faces the first end 41 of the penetration element 40. In the idle state of the hybrid inflator 10 (cf. FIG. 1) the second stop face 52 rests on the notch 66 of the ignition tube 60. With the aid of the second stop face 52 the penetration element 40 is thus prevented from being moved in the direction of the first end 62 of the ignition tube 60.

In a radially circumferential wall 53 of the penetration element 40 in the shown example four gas outlet openings 54 are formed. With the aid of the gas outlet openings 54, in the case of function of the hybrid inflator cold gas flowing out of the pressure gas tank 30 may flow into the mixing chamber 70. In the case of function of the hybrid inflator 10, the penetration element 40 thus cannot cover the outlet opening 31 of the pressure gas tank 30 in a gas-tight manner. Accordingly, especially the cold gas from the pressure gas tank 30 may flow through the portion 91 through which gas may flow, namely coming from the pressure gas tank 30, initially via the second hollow 95 and further via at least one of the four gas outlet openings 54.

The radially circumferential wall 53 also delimits the second hollow 95 in portions in the radial direction.

As two recesses 45 are introduced into the penetration element 40 and, resp., two interruptions 46 are introduced into the penetration edge 44, the bursting element 32 cannot be evenly damaged. The possibility of tearing and/or punching out a large circular area of the bursting element 32 is strongly reduced due to this formation of a penetration element 40. Should nevertheless a portion of the bursting element 32 be punched or torn out, the cold gas provided in the pressure gas tank 30 may pass through the recesses 45 into the first hollow 43 and continue flowing through the gas outlet openings 54 into the mixing chamber 70.

FIG. 4 illustrates an alternative embodiment of a penetration element 40. This, too, includes a first end 41 as well as a second end 42, wherein, analogously to FIG. 3a and FIG. 3c, equally a first hollow 43, an approach element 92 having a first approach surface 93 and a second approach surface 94 and a second hollow 95 are formed therebetween. Also, a penetration edge 44 is divided into individual penetration portions 47 again because of interruptions 46 and, resp., recesses 45. The recesses 45 again constitute two penetration legs 48. In the area of the penetration edge portions 47 moreover tapers 49 are formed so that destruction of the bursting element 32 is facilitated. There are equally shown the first stop face 50 and the second stop face 52 both of which are formed by reason of the shoulder portion 51. The two gas outlet openings 54 are formed because of extended recesses 45 in the embodiment according to FIG. 4, however. In other words, the gas outlet openings 54 are formed by the partial portions and, resp., end portions 55 of the recesses 45.

The round gas outlet openings 54 illustrated in FIGS. 3a-3c are formed by an extension of the recesses 45 in the embodiment according to FIG. 4. Hence in this case it is not necessary to incorporate holes into the shoulder portion 51 in a further manufacturing step.

The penetration element 40 according to the embodiment of FIG. 4 moreover includes a clearance 56. For example, a sealing element may be introduced into said clearance. The clearance 56 is configured to be a fully peripheral groove.

It is referred to the fact that the hybrid inflator 10 shown in FIGS. 1 and 2 may also be configured with an alternative penetration element. It is especially possible that the penetration element does not correspond to the embodiments according to FIGS. 3a-4.

In addition, it is referred to the fact that the penetration elements 40 shown in FIGS. 3a to 4 may also be configured in alternative inflators, especially hybrid inflators which do not correspond to the embodiments according to FIGS. 1 and 2.

LIST OF REFERENCE NUMERALS 10 hybrid inflator
15 igniter
16 igniter cap
18 solid ring
20 combustion chamber
21 housing portion
30 pressure gas tank
31 outlet opening
32 bursting element
33 bursting element holder
34 end face
40 penetration element
41 first end of penetration element
42 second end of penetration element
43 first hollow
44 penetration edge
45 recess
46 interruption 47 penetration edge portion
48 penetration leg
49 taper
50 stop face
51 shoulder portion
52 stop face
53 wall
54 gas outlet opening
55 end portion of recess
56 clearance
60 ignition tube
61 ignition channel
62 first end of ignition tube
63 second end of ignition tube
64 opening
65 collar portion
66 notch
70 mixing chamber
75 generator opening
80 partition wall
81 combustion chamber side
82 mixing chamber side
85 combustion chamber opening
88 cover
89 propellant body
90 booster element
91 portion through which gas may flow
92 approach element
93 first approach area
94 second approach area
95 second hollow
L longitudinal axis of hybrid inflator
LE longitudinal extension of penetration element
E91 extension area of the portion through which gas may flow

The invention claimed is:

1. A hybrid inflator (10) comprising
a combustion chamber (20) and a pressure gas tank (30), wherein in an idle state of the hybrid inflator (10) an outlet opening (31) of the pressure gas tank (30) is closed by a bursting element (32) which in the case of function of the hybrid inflator (10) can be destroyed by means of a penetration element (40) displaced by ignition gas, with a mixing chamber (70) being formed between the pressure gas tank (30) and the combustion chamber (20), the penetration element (40) including a first hollow portion (43) for receiving the ignition gas for displacing the penetration element (40) into the bursting element (32) and a second hollow portion (95) for fluidly connecting the pressure gas tank (30) and the mixing chamber (70) when the bursting element (32) is destroyed, wherein between the combustion chamber (20) and the mixing chamber (70) at least in portions a partition wall (80) having a combustion chamber side (81) and a mixing chamber side (82) is formed, wherein the partition wall (80) includes at least one combustion chamber opening (85) which in the idle state of the hybrid inflator (10) is closed by a cover (88) formed on the mixing chamber side (82) of the partition wall (80).

2. The hybrid inflator (10) according to claim 1, wherein the cover (88) is a membrane and/or film made from metal, wherein the mixing chamber (70) has at least one generator opening (75) for fluid-communicating the hybrid inflator (10) with an element to be inflated.

3. The hybrid inflator (10) according to claim 1, wherein in the case of function of the hybrid inflator (10) the gas pressure generated or adapted to be generated within the combustion chamber (20) is lower than the pressure prevailing in the pressure gas tank (30) in the idle state of the hybrid inflator (10).

4. The hybrid inflator (10) according to claim 3, wherein in the combustion chamber (20) an ignition tube (60) is formed, wherein the penetration element (40) is longitudinally movable at least in portions inside the ignition tube (60), wherein the ignition tube (60) is filled with a pyrotechnical igniting mixture and/or a pyrotechnical booster charge, the ignition tube (60) including at least one opening (64) for fluid communicating an inner area of the ignition tube (60) with the combustion chamber (20).

5. The hybrid inflator (10) according to claim 4, wherein the ignition tube (60) at its end (63) facing the pressure gas tank (30) includes a collar portion (65) forming the partition wall (80) between the combustion chamber (20) and the mixing chamber (70), wherein in the longitudinal extension (L) of the hybrid inflator (10) the ignition tube (60) is completely surrounded by a combustion chamber (20) of circular ring shape in cross-section.

6. An airbag module comprising a hybrid inflator (10) according to claim 1.

7. The hybrid inflator according to claim 1, wherein the cover is a tamping.

8. The hybrid inflator according to claim 1, wherein the cover is formed from one of steel, copper, and aluminum.

9. The hybrid inflator according to claim 1, wherein the mixing chamber fluidly communicates the hybrid inflator with an airbag.

10. The hybrid inflator according to claim 1, wherein the second hollow portion includes at least one axially extending recess and at least one radially extending gas outlet.

11. The hybrid inflator according to claim 1, wherein the at least one radially extending gas outlet is formed as an extension of the at least one recess.

12. The hybrid inflator according to claim 1, wherein the second hollow portion extends between penetration legs on the penetration element that destroy the bursting element.

13. The hybrid inflator according to claim 1 wherein further comprising an annular groove encircling the first hollow portion for receiving a sealing ring.

14. The hybrid inflator according to claim 1, wherein at least a portion of the penetration element is spaced axially from the pressure gas tank when the hybrid inflator is in the idle state.

15. A hybrid inflator comprising:
a combustion chamber;
a pressure gas tank having an outlet opening;
a bursting element closing the outlet opening when the hybrid inflator is in an idle state;
a mixing chamber formed between the pressure gas tank and the combustion chamber;
a partition wall formed at least in portions between the combustion chamber and the mixing chamber and having a combustion chamber side and a mixing chamber side, the partition wall includes at least one combustion chamber opening;
a cover formed on the mixing chamber side of the partition wall for closing the at least one combustion chamber opening when the hybrid inflator is in the idle state; and
a penetration element movable by ignition gas for destroying the bursting element when the hybrid inflator is in a functional case, the penetration element including a first hollow portion for receiving the ignition gas for displacing the penetration element into the bursting element and a second hollow portion for fluidly connecting the pressure gas tank and the mixing chamber when the bursting element is destroyed.

* * * * *